May 28, 1935. J. A. SPENCER 2,003,018
THERMOSTAT
Filed Sept. 8, 1930
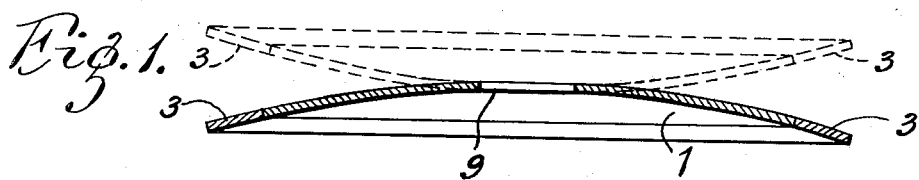
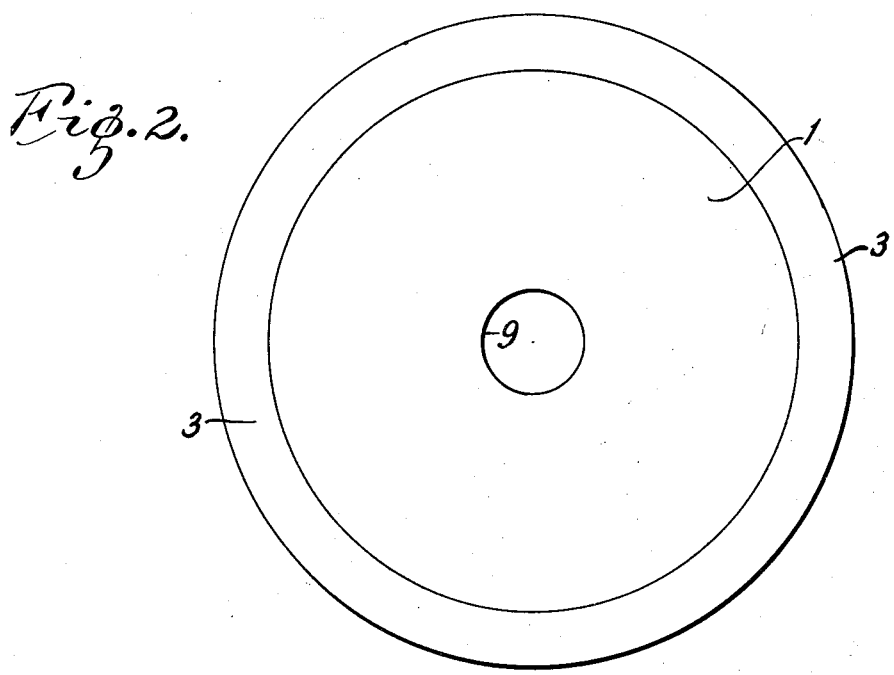
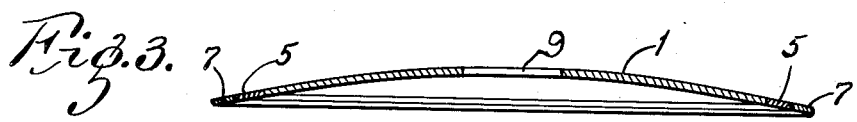
John A. Spencer, Inventor.
Delos G. Haynes, Attorney.

Patented May 28, 1935

2,003,018

UNITED STATES PATENT OFFICE 2,003,018

THERMOSTAT

John A. Spencer, Newtonville, Mass., assignor to General Plate Company, Attleboro, Mass., a corporation of Massachusetts Application September 8, 1930, Serial No. 480,453

6 Claims. (Cl. 297—11)

This invention relates to thermostats, and with regard to certain more specific features to a snap-acting thermostat.

Among the several objects of the invention may be noted the provision of a thermostat which is adapted to be moved by extraneous means from one position to another and which will reposition itself at a predetermined temperature; the provision of a thermostat of the class described which has per se no articulated joints and which comprises a simple, unitary structure which is readily adaptable to various applications. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which are illustrated several of various possible embodiments of the invention, Fig. 1 is a cross section showing one form of the invention, the dotted lines showing an alternate position;

Fig. 2 is a plan view of Fig. 1;

Fig. 3 is a view similar to Fig. 1, showing another form, the dotted position being omitted; and Fig. 4 is a view similar to Fig. 3 showing another form.

Similar reference characters indicate corresponding parts throughout the several views of the drawing.

Referring now more particularly to Fig. 1, there is illustrated at numeral 1 a pre-formed, cupped disc of shape and curvature such that the disc per se tends always to spring to the solid-line position, such as from the dotted line position, unless acted upon by an external force or forces. That is to say, when strained from the solid-line position, stresses are set up tending to return the disc to that position. The disc 1 may, for example, comprise sheet steel.

There is applied peripherally a band 3 of another material, for example copper, this peripheral band having a different thermal coefficient of expansion. In the case of copper it is higher than that of steel. The band may be soldered, brazed or welded, as illustrated. Any autogenous method may be used.

The operation is as follows:

Assuming a relatively low temperature in the solid-line position, the device may, while at this temperature, be sprung to the dotted-line, strained position. This is done by external means, manual or otherwise, depending upon the particular application of the device. Under these conditions the disc 1 temporarily expands the rim or band 3 which is temporarily put into peripheral tension while the disc is put into radial compression. After over-centering has occurred, the shrinking action of the band may maintain the device in the dotted-line position or the perimeter of the disc may so maintain itself.

If the temperature be now increased, the parts 1 and 3 will expand but inasmuch as the thermal coefficient of expansion of the band is greater than that of the disc its peripheral tension is reduced and finally a point is reached upon a predetermined temperature at which the disc can exert its tendency to return to the full-line position, this being accomplished by means of the inherent snap action of the disc.

If it be desired to reduce the stresses in the material caused by heating, two bands 5, 7 may be used, such as shown in Fig. 3. In this example the elements 1, 5 and 7 are all different materials, for instance steel, steel-copper alloy, and copper, referring to the parts 1, 5, 7 in order.

If it be desired to reverse the action so that a snap-back is attained upon cooling, the arrangement of materials should be reversed, for instance, the materials of higher thermal coefficient of expansion being innermost. Then the operation is as follows, assuming in Fig. 1 that the disc is copper and the band steel:

At a relatively high temperature, the externally forced snap to the dotted-line position results in the device remaining there, because of the peripheral tension of the band and the radial compression of the disc. Upon subsequent cooling, the copper shrinks faster, thus relieving the binding tension in the more slowly shrinking band, and the device snaps back.

In Fig. 4 is shown another form of the invention in which the radial gradient of thermal coefficient of expansion is gradual, instead of by finite steps as in the Figs. 1 to 3 forms. In this case the metal changes its constituency gradually as radial distance is traversed. One method of making a disc of this type is to make a rod, or tube, of one metal, say nickel, and using this as a cathode electrolytically coating it from two anodes of different materials, for instance nickel and copper. By controlling the rate of metal given up at each anode, the character of the metal deposited may be varied as required as the cylinder is built up. Then the resulting cylinder may be cut into discs which are subsequently formed with a cup shape or bulge. It is to be understood that the discrete-step type described above (Fig. 3) may also be electrolytically constructed by plating from one anode at a time.

The operation of the Fig. 4 form is similar to that of the others, with the added improvement that certain internal stresses due to heating are eliminated. This form may be made to snap upon temperature rise or reduction, depending upon which material is outermost. Also, the gradation may be uniform or otherwise.

The opening shown at numeral 9 is for purposes of attachment to mechanisms adapted to be operated by the device, such as switches, valves and the like, but it is to be understood that other means of fastening may be used.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A thermostat comprising at least one cup-shaped mass of material and other materials joined thereto and surrounding the same, said other materials comprising non-discrete masses having a gradual radial gradation of thermal coefficient of expansion.

2. A thermostat comprising a normally circular, bulged disc of one material, said disc being adapted to be snapped to an over-centered position at one temperature, means for maintaining the over-centered position comprising a surrounding mass of another material fastened peripherally to the disc, the thermal coefficient of expansion of said other material having such a relation to the thermal coefficient of expansion of the disc as to permit a return snap action at another predetermined temperature, said other material comprising a non-discrete mass.

3. A unitary thermostat comprising a sheet of resilient material normally formed with a concavity in one direction, and being so constituted that it may be overcentered by an externally applied force to a position of opposite concavity, but returning under its own impulse to the original position of concavity as soon as said external force is removed, said disc having a peripheral portion of differing temperature coefficient of expansion from its central portion, said peripheral portion being a substantially superficial extension of said central portion, whereby, upon change of temperature in the proper sense, said sheet may be overcentered by the external application of forces to its abnormal position, wherein said central portion is maintained under radial compression by the said peripheral portion until a sufficient temperature change in the reverse sense takes place to release the radial compression due to the differential expansions of said central portion and said peripheral portion, whereupon the sheet returns, under its own impulse, to its normal position of concavity.

4. A thermostat as set forth in claim 3 in which the central portion and the peripheral portion are discrete.

5. A thermostat as set forth in claim 3 in which the central portion and the peripheral portion are non-discrete.

6. A thermostat as set forth in claim 3 in which the peripheral portion comprises two discrete concentric bands.

JOHN A. SPENCER.